United States Patent [19]
Nakazawa

[11] Patent Number: 6,070,951
[45] Date of Patent: Jun. 6, 2000

[54] HYDRAULIC BRAKE SYSTEM OF MOTOR VEHICLE

[75] Inventor: Chiharu Nakazawa, Kawasaki, Japan

[73] Assignee: Inisia Jecs Corporation, Atsugi, Japan

[21] Appl. No.: 09/041,655

[22] Filed: Mar. 13, 1998

[30] Foreign Application Priority Data

Mar. 17, 1997 [JP] Japan ....................................... 9-62753

[51] Int. Cl.⁷ ................................. B60T 13/14; B60T 8/34
[52] U.S. Cl. ...................................... 303/113.2; 303/116.2; 303/116.4
[58] Field of Search ..................... 303/10, 113.2, 303/115.4, 116.1, 116.2, 116.4, 140

[56] References Cited

U.S. PATENT DOCUMENTS

| | | | |
|---|---|---|---|
| 4,875,741 | 10/1989 | Ozawa et al. | 303/116.4 |
| 4,962,972 | 10/1990 | Pizzo | 303/10 |
| 5,176,428 | 1/1993 | Lebret | 303/10 |
| 5,188,437 | 2/1993 | Willmann | 303/116.2 |
| 5,205,623 | 4/1993 | Holzmann et al. | 303/113.2 |
| 5,207,487 | 5/1993 | Holzmann et al. | 303/113.2 |
| 5,213,482 | 5/1993 | Reinartz et al. | 303/10 |
| 5,236,253 | 8/1993 | Glasmacher | 303/87 |
| 5,302,011 | 4/1994 | Volz et al. | 303/116.1 |
| 5,601,345 | 2/1997 | Tackett | 303/116.4 |
| 5,628,625 | 5/1997 | Dokas | 303/116.4 |
| 5,716,111 | 2/1998 | Schenk et al. | 303/116.4 |
| 5,788,342 | 8/1998 | Noguchi | 303/116.2 |

*Primary Examiner*—Chris Schwartz
*Attorney, Agent, or Firm*—Foley & Lardner

[57] ABSTRACT

A brake circuit is provided for providing a fluid communication between a master cylinder and a brake cylinder of a road wheel. A fluid pressure control valve is installed in the brake circuit for controlling the fluid pressure in the brake cylinder. A reservoir is connected to a discharge circuit extending from the fluid pressure control valve. A pump includes a cylinder member, a plunger movably disposed in the cylinder member to define a volume variable pressure chamber, and a seal member operatively disposed between the cylinder member and the plunger to hermetically insulating the pressure chamber. A first inlet circuit conveys the brake fluid in the reservoir to the pressure chamber of the pump, a second inlet circuit conveys the brake fluid in the master cylinder to the pressure chamber of the pump, and an outlet circuit conveys the brake fluid in the pressure chamber of the pump to the fluid pressure control valve. An outside gate valve selectively opens and closes the brake circuit. An inside gate valve selectively opens and closes the second inlet circuit. A control unit controls the fluid pressure control valve, the pump and the outside and inside gate valves for carrying out an antilock brake control and a vehicle motion stabilizing control. The cylinder member of the pump is formed with an opening through which the second inlet circuit is fluidly communicated with the pressure chamber of the pump. The opening is exposed to the pressure chamber even when the plunger takes a deepest position in the cylinder member to minimize the size of the pressure chamber.

13 Claims, 4 Drawing Sheets

HYDRAULIC BRAKE SYSTEM OF MOTOR VEHICLE

BACKGROUND OF THE INVENTION

1. Field of the Invention

The present invention relates in general to hydraulic brake systems of wheeled motor vehicles, and more particularly to the hydraulic brake systems of a type having both an antilock brake system (viz., ABS) and a vehicle motion stabilizing control system which will be referred to as "VMSCS" hereinafter for ease of description. As is known, the ABS is a system for suppressing a lock of road wheels upon braking. In the VMSCS, there are two types, one type being a traction control system which functions to suppress a slip of drive road wheel or wheels by applying a controlled braking force to the drive road wheel or wheels in accordance with the running condition of the vehicle, and the other type being a yaw rate control system which, for stabilizing the attitude of the vehicle, controls the yaw rate of the vehicle by applying a controlled braking force to a selected road wheel or wheels in accordance with the running condition of the vehicle.

2. Description of the Prior Art

Japanese Patent First Provisional Publication 7-50106 shows a hydraulic brake system of the type having both the ABS and the VMSCS. In the brake system of this publication, an ABS unit is installed in a hydraulic brake circuit which extends from a mastery cylinder to each of brake cylinders of road wheels. The ABS unit comprises generally a hydraulic pressure control valve which, for controlling a hydraulic pressure of the brake cylinders, includes inlet and outlet valves, a reservoir which temporarily reserves the brake fluid discharged from the hydraulic pressure control valve, and a main pump which sucks the brake fluid from the reservoir and returns the same to the brake circuit. Through a normally closed electromagnetic valve (viz., inside gate valve) which opens only when the VMSCS operates, the main pump sucks a pressurized fluid from an auxiliary pump and sucks the brake fluid from the master cylinder.

Accordingly, under operation of the VMSCS, the main pump can feed the brake circuit with a pressurized brake fluid even when a brake pedal is not actuated. That is, due to the pressurized fluid thus fed from the main pump, the ABS unit can increase the pressure in each brake cylinder and thus produce a braking force.

Figure 4:
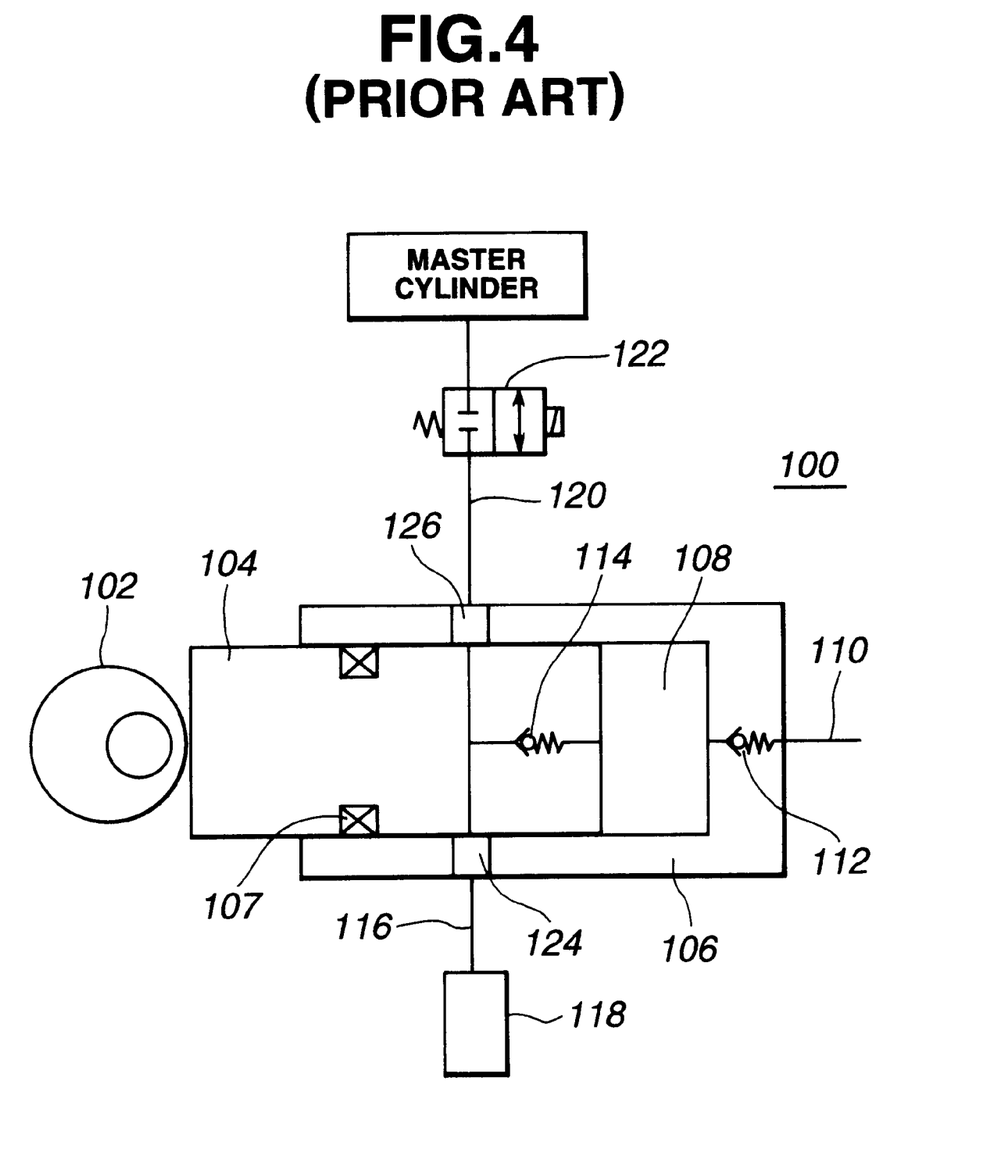
FIG. 4 is a schematic view of a conventional technique employed in a known hydraulic brake system.

As the main pump, a so-called plunger type is commonly used wherein a plunger is reciprocatively moved in a cylinder member by a rotating cam. FIG. 4 shows schematically a pump 100 of such plunger type. Denoted by numeral 102 is a cam driven by a motor (not shown), and 104 is a plunger whose base end contacts the cam 102. The plunger 104 is slidably received in a cylinder member 106 in a manner to define a pressure chamber 108 between a leading end of the plunger 104 and a bottom of the cylinder member 106. A seal member 107 is arranged between a cylindrical outer surface of the plunger 104 and a cylindrical inner surface of the cylinder member 106 to achieve a hermetical sealing therebetween. The pressure chamber 108 is communicated with an outlet circuit 110 through an outlet valve 112 installed in the bottom of the cylinder member 106. The outlet circuit 110 is communicated with a brake circuit (not shown). Furthermore, the pressure chamber 108 is communicated, through an inlet valve 114 installed in the plunger 104, with both a first inlet circuit 116 connected to a reservoir 118 and a second inlet circuit 120 connected to a master cylinder. The first and second inlet circuits 116 and 120 include respective openings 124 and 126 formed in a cylindrical wall of the cylinder member 106. Within the second inlet circuit 120, there is installed an inside gate valve 122.

Thus, under operation of the ABS wherein the inside gate valve 122 is in its closed condition, the main pump 100 sucks the brake fluid from the reservoir 118, compresses the same in the pressure chamber 108 and discharges the same to the brake circuit through the outlet circuit 110. While, under operation of the VMSCS wherein the inside gate valve 122 is in its open condition, the main pump 100 sucks the brake fluid from the master cylinder and the auxiliary pump through the second inlet circuit 120 and discharges the same to the brake circuit through the outlet circuit 110.

In the above-mentioned conventional brake system, the inlet valve 114, which is a check valve, works for both the first and second inlet circuits 116 and 120. That is, the inlet valve 114 is installed in the junction part of the two circuits 116 and 120, which part is located in the plunger 104, as shown. In other words, the fluid communication between the pressure chamber 108 and each of the first and second inlet circuits 116 and 120 is made through the opening 124 or 126 which faces the cylindrical outer surface of the plunger 104 throughout the stroke of the plunger 104.

However, due to its inherent construction, the abovementioned brake system has the following drawback which tends to appear when a driver actuates a brake pedal under operation of the VMSCS.

As is mentioned hereinabove, under operation of the VMSCS, the inside gate valve 122 is opened and thus the main pump 100 sucks the brake fluid from, the master cylinder and the auxiliary pump. If, under this operation, the driver depresses the brake pedal to slow down the associated vehicle, the pressure produced in the master cylinder is transmitted between the plunger 104 and the cylinder member 106 through the second inlet circuit 120. Thus, upon the brake pedal depression, a closed clearance defined between the inlet valve 114 and the seal member 107 is highly pressurized, which tends to bring about a function-failure of the seal member 107. For eliminating such failure, a measure has been proposed, in which a master cylinder pressure sensor and/or a brake pedal stroke sensor is employed and the inside gate valve 122 is closed when the pressure in the master cylinder increases beyond a permitted level. However, even this measure has failed to satisfy users because of increased cost of the brake system due to employment of such additional and parts.

SUMMARY OF THE INVENTION

It is therefore an object of the present invention to provide a hydraulic brake system having both an ABS and a VMSCS, which can provide the main pump with a reliable oiltight performance even when the master cylinder produces a high brake pressure under operation of the VMSCS.

According to the present invention, there is provided a hydraulic brake system for use in a motor vehicle having a brake pedal, and at least one road wheel which is equipped with a hydraulically actuated brake cylinder. The hydraulic brake system comprises a fluid pressure generating means for generating a brake fluid pressure in accordance with an actuation of the brake pedal; a brake circuit for providing a fluid communication between the fluid pressure generating means and the brake cylinder; a fluid pressure control valve installed in the brake circuit for controlling the fluid pressure in the brake cylinder; a reservoir connected to a discharge circuit extending from the fluid pressure control valve; a pump including a cylinder member, a plunger movably disposed in the cylinder member to define a volume variable pressure chamber, and a seal member operatively disposed between the cylinder member and the plunger to hermetically insulating the pressure chamber; a first inlet circuit for conveying the brake fluid in the reservoir to the pressure chamber of the pump; a second inlet circuit for conveying the brake fluid in the fluid pressure generating means to the pressure chamber of the pump; an outlet circuit for conveying the brake fluid in the pressure chamber of the pump to the fluid pressure control valve; an outside gate valve for selectively opening and closing the brake circuit; an inside gate valve for selectively opening and closing the second inlet circuit; and a control unit for controlling the fluid pressure control valve, the pump and the outside and inside gate valves for carrying out an antilock brake control and a vehicle motion stabilizing control, wherein the cylinder member of the pump is formed with a pressure chamber exposed opening through which the second inlet circuit is fluidly communicated with the pressure chamber of the pump, the pressure chamber exposed opening being exposed to the pressure chamber even when the plunger takes a deepest position in the cylinder member to minimize the size of the pressure chamber.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
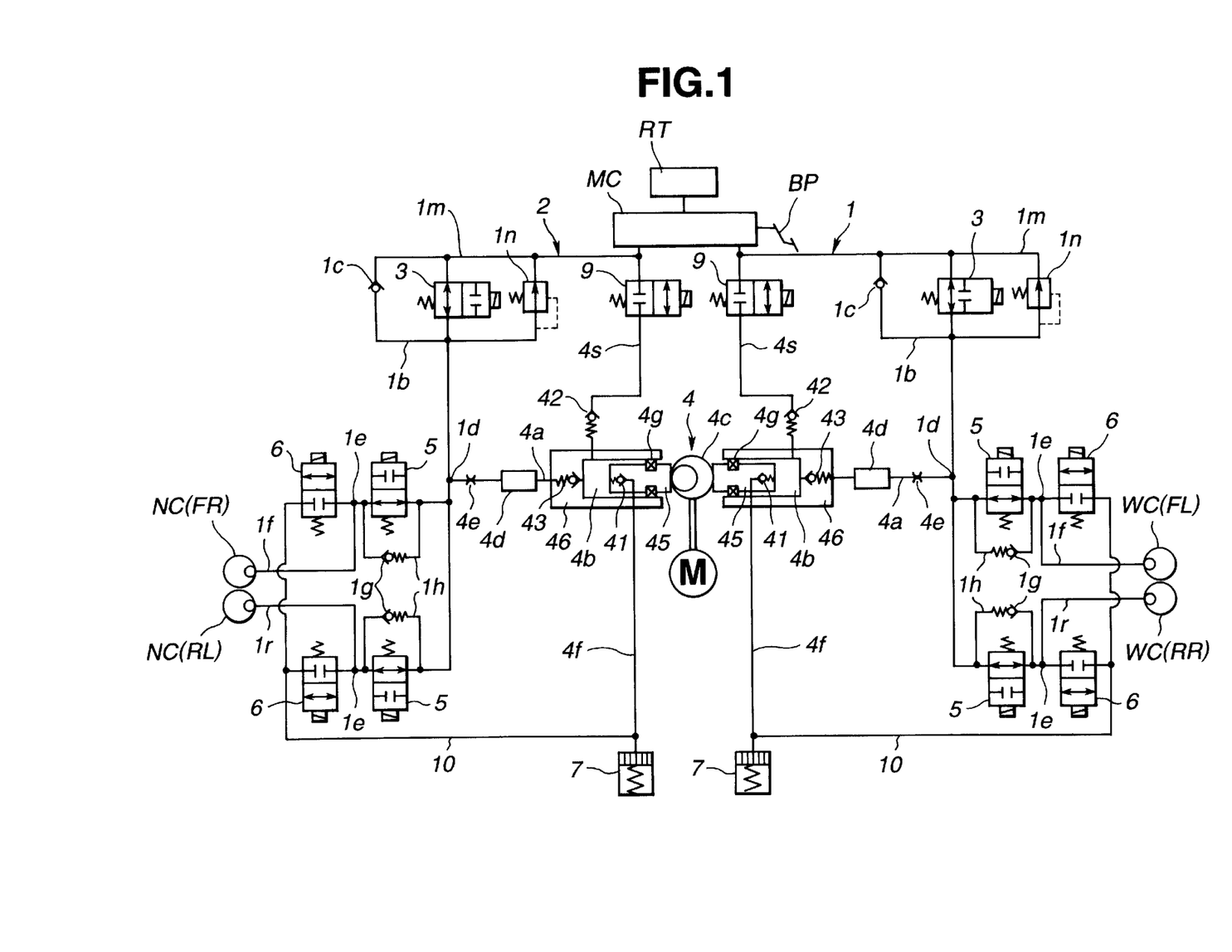
FIG. 1 is a schematic view of a hydraulic brake system according to the present invention.
Figure 2:
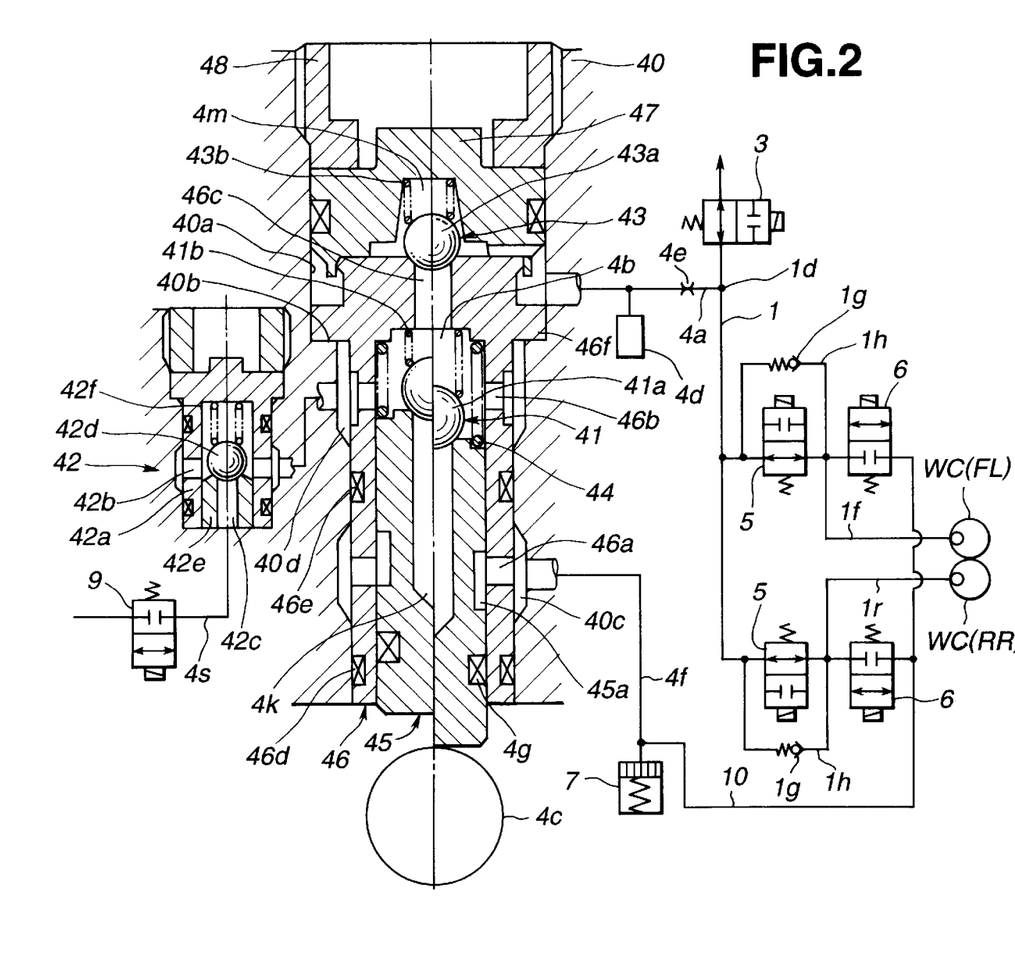
FIG. 2 is a sectional view of an essential part employed in the hydraulic brake system of the present invention.
Figure 3:
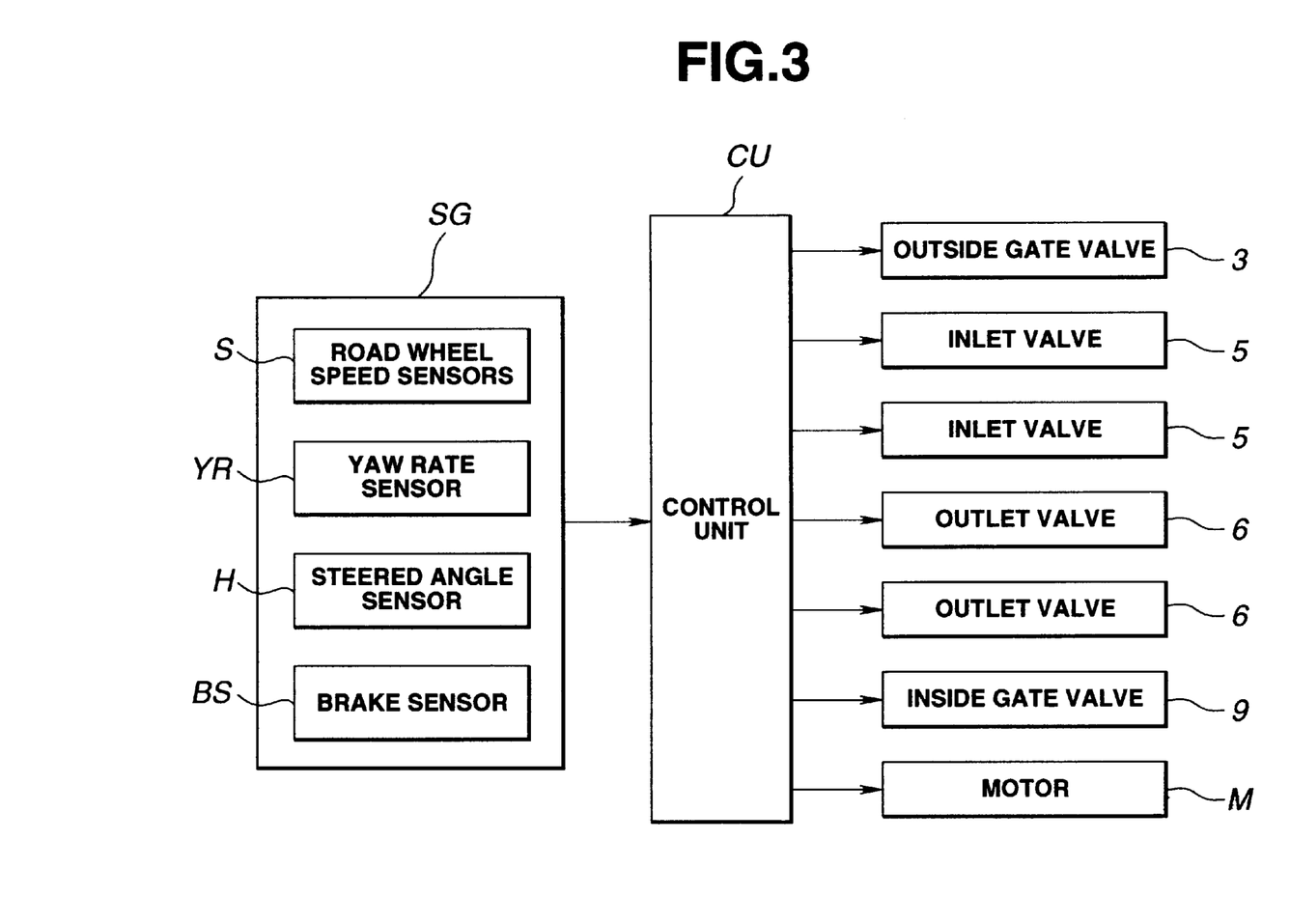
FIG. 3 is a block diagram of an essential portion of the hydraulic brake system of the present invention.

Referring to FIGS. 1 to 3, particularly FIG. 1, there is schematically shown a hydraulic brake system according to the present invention.

In the drawing, denoted by references WC are brake cylinders of road wheels and MC is a master cylinder as a brake pressure generating means. The master cylinder MC is actuated by a brake pedal BP and equipped with a reservoir tank RT. From the master cylinder MC, there extend two hydraulic pipe systems 1 and 2 which are diagonally arranged in X-fashion. That is, the two hydraulic pipe systems are a first channel brake circuit 1 which is connected to the brake cylinder WC(FL) of a front-left road wheel and the brake cylinder WC(RR) of a rear-right road wheel, and a second channel brake circuit 2 which is connected to the brake cylinder WC(FR) of a front-right road wheel and the brake cylinder WC(RL) of a rear-left road wheel.

The first and second channel brake circuits 1 and 2 are substantially the same in construction. Thus, for simplification of description, the following explanation will be directed to only the first channel brake circuit 1. In the two brake circuits 1 and 2, substantially same parts and constructions are denoted by the same numerals. Furthermore, for ease of understanding, in the two brake circuits 1 and 2, portions near the master cylinder MC will be referred to as upstream portions, and portions near the brake cylinders WC will be referred to as downstream portions.

The first channel brake circuit 1 (or second channel brake circuit 2) comprises a rear wheel branch circuit 1r led to the rear-rightwheel brake cylinder WC(RR) and a front wheel branch circuit 1f led to the front-left wheel brake cylinder WC(FL).

At an upstream portion of the first channel brake circuit 1, there is installed an outside gate valve 3. A gate valve bypass circuit 1b and a relief circuit 1m are arranged to bypass the outside gate valve 3. The outside gate valve 3 is of an electromagnetic valve of two-ports and two-positions normally open type, which, when deenergized, opens the first channel brake circuit 1 due to force of an installed spring, and when energized, closes the circuit 1. The gate valve bypass circuit 1b includes a one-way valve 1c which permits only a fluid flow in the direction from the master cylinder MC toward the brake cylinders WC. The relief circuit 1m includes a relief valve 1n which permits a fluid flow in the direction from the downstream portion toward the upstream portion when a pressure difference between the downstream and upstream portions exceeds a predetermined degree.

The rear wheel branch circuit 1r and the front wheel branch circuit 1f include each an inlet valve 5 and an outlet valve 6. These valves 5 and 6 are arranged to control (that is, reduce, keep and increase) the brake fluid pressure fed to the brake cylinders.WC. The inlet valve 5 is installed in a part of the wheel branch circuit 1r or 1f and is of an electromagnetic valve of two-ports and two-positions normally open type, which, when deenergized, opens the circuit 1r or 1f due to force of an installed spring, and when energized, closes the circuit 1r or 1f. As shown, the wheel branch circuit 1r or 1f has a branch point 1e at a part just downstream of the inlet valve 5. The outlet valve 6 is installed in a discharge circuit 10 which extends from the branch point 1e to a reservoir 7. The outlet valve 6 is of an electromagnetic valve of two-ports and two-positions normally closed type, which, when deenergized, closes the discharge circuit 10 and when energized, opens the circuit 10. In the wheel branch circuit 1r or 1f, an inlet valve bypass circuit 1h is arranged to bypass the inlet valve 5. The inlet valve bypass circuit 1h includes a one-way valve 1g which permits only an upstream fluid flow in the circuit 1h.

From the reservoir 7, there extends a first inlet circuit 4f to a pump 4 which sucks through the circuit 4f the brake fluid in the reservoir 7. From the pump 4, there extends an outlet circuit 4a to a connecting point 1d of the first channel circuit 1 between the outside gate valve 3 and each of the wheel branch circuits 1r and 1f. The outlet circuit 4a includes a damper 4d and an orifice 4e which damp a pulsation of the brake fluid flow in the circuit 4a.

From the pump 4, there further extends a second inlet circuit 4s to the master cylinder MC, through which the pump 4 sucks the brake fluid from the master cylinder MC. In a part of the second inlet circuit 4s, there is installed an inside gate valve 9. This valve 9 is of an electromagnetic valve of two-ports and two-positions normally closed type, which, when deenergized, closes the second inlet circuit 4s due to force of an installed spring, and when energized, opens the circuit 4s.

In the following, the detail of the pump 4 will be described with reference to FIGS. 1 and 2.

As is seen from FIG. 1, the pump 4 comprises a cam 4c driven by an electric motor M, a plunger 45 reciprocatively moved by the cam 4c and a cylinder member 46 for receiving the plunger 45. The plunger 45 has a base end contacting the cam 4c, and the cylinder member 46 defines therein a pressure chamber 4b exposed to a leading end of the plunger 45.

A seal member 4g is arranged between a cylindrical outer surface of the plunger 45 and a cylindrical inner surface of the cylinder member 46 to achieve a hermetical sealing therebetween, that is, a hermetical isolation of the pressure chamber 4b.

Within the plunger 45, there is installed a first inlet valve 41 which permits only a fluid flow in the direction from the reservoir 7 to the pressure chamber 4b, and within a bottom portion of the cylinder member 46, there is installed an outlet valve 43 which permits only a fluid flow in the direction from the pressure chamber 4b toward the connecting point 1d. In the second inlet circuit 4s, there is installed a second inlet valve 42 which permits only a fluid flow in the direction from the master cylinder MC to the pressure chamber 4b.

As is seen from FIG. 1, the plungers 45 and 45 for the first and second channel brake circuits 1 and 2 are aligned having the cam 4c positioned therebetween. That is, the base ends of the plungers 45 and 45 face each other having the cam 4c placed therebetween. Thus, as is understood from the drawing, when the cam 4c is in an angular position to cause one of the plungers 45 and 45 to take a deepest position in the corresponding cylinder member 46, the other plunger 45 takes a shallowest position in the other cylinder member 46.

In the following, a peripheral construction of the pump 4 will be described in detail with reference to FIG. 2.

The cylinder member 46 is tightly installed in a bore 40a formed in a housing 40 of the pump 4. The cylinder member 46 is formed at its bottom portion with a flange 46f which is seated on an annular step 40b formed in the bore 40a. A circular plug 47 is tightly put on the bottom portion of the cylinder member 46 by means of a nut 48 screwed in the bore 40a. In a cylindrical inner wall of the bore 40a of the housing 40, there are formed first and second annular grooves 40c and 40d which are axially spaced from each other. To the first annular groove 40c, there is exposed the first inlet circuit 4f, and to the second annular groove 40d, there is exposed the second inlet circuit 4s. Two seal members 46d and 46e are disposed about the cylinder member 46 at axially spaced positions. As shown, the first annular groove 40c is placed between the two seal members 46d and 46e. Between the bottom portion of the cylinder member 46 and the circular plug 47, there is defined a discharge chamber 4m. The discharge chamber 4m is communicated with the pressure chamber 4b through a valve hole 46c formed in the bottom portion of the cylinder member 46.

The cylinder member 46 is formed, at diametrically opposed portions remote from the bottom portion thereof, with first aligned openings 46a (viz., plunger outer surface exposed opening) which are exposed to the first annular groove 40c. Thus, through the first openings 46a, the brake fluid can be led into the interior of the cylinder member 46 from the first inlet circuit 4f. The cylinder member 46 is further formed, at diametrically opposed portions near the bottom portion thereof, with second aligned openings 46b (viz., pressure chamber exposed opening) which are exposed to both the second annular groove 40d and the pressure chamber 4b. Thus, through the second openings 46b, the brake fluid can be led into the pressure chamber 4b in the cylinder chamber 46 from the second inlet circuit 4c.

It is thus to be noted that the first openings 46a always face the outer surface of the plunger 45 throughout the stroke of the plunger 45 and the second openings 46b always face the pressure chamber 4b throughout the stroke of the plunger 45. In other words, the second openings 46b are not closed by the plunger 45 even when the plunger 45 takes a deepest position in the cylinder member 46 to minimize the size of said pressure chamber 4b.

The plunger 45 is formed with both an annular recess 45a and an axially extending bore 4k through which the first openings 46a are communicated with the pressure chamber 4b.

The first inlet valve 41 comprises a ball 41a movably received in the pressure chamber 4b. Due to force of a biasing spring 41b compressed in the pressure chamber 4b, the ball 41 is pressed upon an open end of the axially extending bore 4k of the plunger 45. Within the pressure chamber 4b, there is further installed a return spring 44 by which the plunger 45 is biased downward in FIG. 2, that is, in the direction to expand the pressure chamber 4b.

The second inlet valve 42 installed in the second inlet circuit 4s comprises a cylinder member 42a installed in a bore formed in the housing 40. The cylinder member 42a is formed at diametrically opposed portions with aligned openings 42b through which the interior of the cylinder member 42a is communicated with the above-mentioned second annular groove 40d of the housing 40. An apertured plug 42e is fitted in the cylinder member 42a having an axially extending hole 42c thereof exposed to the interior of the cylinder member 42a. A ball 42d is put on an open end of the hole 42c and biased by a spring 42f in the direction to close the hole 42c.

The outlet valve 43 comprises a ball 43a which is received in the discharge chamber 4m and put on an open end of the valve hole 46c. Due to force of a biasing spring 43b compressed in the discharge chamber 4m, the ball 43a is biased in the direction to close the valve hole 46c. The discharge chamber 4m is communicated with the above-mentioned outlet circuit 4a.

As is seen from FIG. 3, the above-mentioned electromagnetic valves 3, 5, 5, 6, 6, 9 and the motor M are controlled by a control unit CU to which various information signals produced by a sensor group SG are fed. In the illustrated embodiment, the sensor group SG comprises road wheel speed sensors S each detecting the rotation speed of the corresponding road wheel, a yaw rate sensor YR detecting a yaw rate of the vehicle body, a steered angle sensor H detecting the steered angle of the vehicle and a brake sensor BS detecting whether the vehicle is under a braked condition or not. In addition to these sensors, acceleration sensors for detecting acceleration of the vehicle may be employed. Based on the information signals issued from the sensors, the control unit CU calculates a slip ratio of each road wheel. When, upon braking, the slip ratio exceeds a predetermined value, the control unit CU operates the ABS to reduce the slip ratio. While, when, due to rapid starting or rapid acceleration of the vehicle, a slip is about to occur in a drive road wheel, the control unit CU operates the traction control system to suppress the slip, and when, under cruising, the attitude of the vehicle is about to be disordered, the control unit CU operates the yaw rate control system to stabilize the attitude. Since these controls are not directly connected with the present invention, detailed explanation of them will be omitted.

In the following, operation of the hydraulic brake system of the present invention will be described with reference to FIGS. 1 and 2. Since the first and second channel brake circuits 1 and 2 operate in substantially the same manner, the following explanation on operation will be directed to only the first channel brake circuit 1.

For ease of understanding, the description will be commenced with respect to a non-braking condition wherein, as shown in FIG. 1, the electromagnetic valves 3, 5, 5, 6, 6 and 9 and the motor M are all in their deenergized conditions.

A. Normal Braking

When the brake pedal BP is depressed by a driver, the fluid pressure generated in the master cylinder MC is transmitted to both the front-left brake cylinder WC(FL) and the rear-right brake cylinder WC(RR) through the outside gate valve 3, the corresponding inlet valve 5 and the wheel branch circuit 1f or 1r. Thus, under this condition, the front-left road wheel and the rear-right road wheel are braked in accordance with a braking force produced by the master cylinder MC. When the brake pedal BP is released, the brake fluid is returned back to the master cylinder MC travelling the same way in the opposite direction.

B. ABS Control

When, upon braking, the control unit CU judges a high possibility or sign of a lock of some of the road wheels, the control unit CU operates the ABS to reduce the slip ratio to a value within a predetermined range. Under operation of this ABS, the brake fluid pressure is reduced, kept and increased to suppress the lock of the road wheel or wheels.

That is, if, for example, due to the braking operation, the front-left road wheel (or rear-right road wheel) shows the slip ratio exceeding the predetermined value, the control unit CU starts the motor M and energizes both the inlet and outlet valves 5 and 6 of the wheel branch circuit 1f (or 1r) to which the brake cylinder WC(FL) (or WC(RR)) of the lock-signed road wheel is connected. With the energization, the inlet valve 5 is closed and the outlet valve 6 is opened. Thus, the fluid in the brake cylinder WC(FL) (or WC(RR)) is led through the opened outlet valve 6 and the discharge circuit 10 to the reservoir 7 reducing the pressure in the brake cylinder WC(FL) (or WC(RR)). Because, during this, the inlet valve 5 is kept closed, actuation of the brake pedal BP has no effect on the pressure in the brake cylinder. Reduction of pressure in the brake cylinder WC(FL) (or WC(RR)) lowers the braking force applied to the slip signed front-left road wheel (or rear-right road wheel). Due to operation of the pump 4, the brake fluid in the reservoir 7 is returned to the first channel circuit 1 through the first inlet circuit 4f and the outlet circuit 4a.

Due to lowering in braking force of the brake cylinder WC(FL) (or WC(RR)), the slip ratio of the front-left road wheel (or rear-right road wheel) lowers. When thereafter the slip ratio lowers to a predetermined value, the control unit CU deenergizes the outlet valve 6 to close the same. Thus, under this condition, the pressure in the brake cylinder WC(FL) (or WC(RR)) is kept constant.

When thereafter the slip ratio of the front-left road wheel (or rear-right road wheel) lowers to another predetermined value, the control unit CU deenergizes the inlet valve 5 to open the same. Thus, upon this, the highly pressurized brake fluid in the first channel circuit 1 is led into the brake cylinder WC(FL) (or WC(RR)) through the opened inlet valve 5. With this, the braking force of the brake cylinder WC(FL) (or WC(RR)) is increased.

During the depression of the brake pedal BP, the above-mentioned ON/OFF operations of the inlet and outlet valves 5 and 6 are repeated to keep the slip ratio of the slip-signed road wheel within the predetermined range. Thus, effective braking is carried out without causing a lock of the road wheel.

If, due to depression of the brake pedal BP, both the front-left and rear-right road wheels show a slip sign, the control unit CU starts the motor M and energizes and controls all of the inlet and outlet valves 5, 5, 6 and 6 of the wheel branch circuits 1f and 1r in a manner similar to that as mentioned hereinabove. Thus, also in this case, undesired lock of the two road wheels is suppressed.

C. VMSCS Control

When, due to rapid starting or rapid acceleration, the control unit CU judges the necessity of the traction control or yaw rate control by sensing a sign of slip of a drive road wheel or wheels or sensing a sign of poor attitude of the vehicle, the control unit CU starts the motor M to operate the pump 4, energizes both the outside and inside gate valves 3 and 9 and operates the inlet and outlet valves 5 and 6. Thus, the outside gate valve 3 is closed to shut off the first channel circuit 1, and the inside gate valve 9 is opened to open the second inlet circuit 4s. Accordingly, the pump 4 sucks the brake fluid in both the master cylinder MC and the reservoir tank RT and discharges the same to the outlet circuit 4a. With the aid of the inlet and outlet valves 5 and 6, the brake fluid in the outlet circuit 4a controls (or increases, keeps constant and reduces) the pressure in the brake cylinder WC or cylinders WC to reduce the slip ratio of the signed drive road wheel or wheels, or produces a yaw moment in the direction to stabilize the attitude of the vehicle. Unlike the case of the above-mentioned ABS control, in this VMSCS control, the reservoir 7 has no brake fluid contained therein, and thus the pump 4 sucks the brake fluid from only the master cylinder MC (and the reservoir tank RT). (It is to be noted that in case of the ABS control, the initial reduction in pressure in the brake cylinder WC or cylinders WC is carried out by conveying the brake fluid from the brake cylinder or cylinders to the reservoir 7.) One example of the yaw rate control is as follows. That is, when, under turning in one direction, a vehicle shows a sign of oversteer, the rear outer road wheel is given a certain braking force. With this, there is produced a yaw moment in the direction of understeer. While, when, under turning in one direction, the vehicle shows a sign of understeer, the front outer road wheel is given a certain braking force. With this, there is produced a yaw moment in the direction of oversteer.

D. Braking under VMSCS Control

As is mentioned hereinabove, under operation of the VMSCS, the pump 4 sucks the brake fluid from the master cylinder MC through the second inlet circuit 4s. That is, under the expansion stroke of the plunger 45 induced by the rotation of the cam 4c, the brake fluid in the master cylinder MC is sucked or led into the pressure chamber 4b through the second inlet valve 42 and the second aligned openings 46b (see FIG. 2).

That is, under operation of the VMSCS, the pressure in the master cylinder MC is led into the space defined between the first inlet valve 41 (see FIG. 2) and the outlet valve 43. This means that the high pressure produced when the brake pedal BP is depressed is led into the space.

It is now to be noted that the high pressure led into the space has no substantial effect on the seal member 4g, unlike in the case of the above-mentioned conventional hydraulic brake system of FIG. 4. If, like in the conventional hydraulic brake system, the high pressure of the master cylinder MC is led to the first aligned openings 46a (which corresponds to the opening 126 of FIG. 4) which are near the seal member 4g, the pressure produced by the master cylinder MC would be transmitted directly between the plunger 45 and the cylinder member 46. In this case, the seal member 4g would be greatly affected by the pressure.

If the pressurized brake fluid in the pressure chamber 4b leaks and flows between the outer surface of the plunger 45 and the inner surface of the cylinder member 46, the leaking brake fluid would be collected in the first aligned openings 46a and led to the reservoir 7 through the first inlet circuit 4f. Thus, the pressurized leaking fluid is not applied to the seal member 4g.

As is understood from the above description, even when, under operation of the VMSCS, the brake pedal BP is depressed, undesired leakage of brake fluid through the seal member 4g is suppressed. That is, according to the present invention, a reliable oiltight performance is possessed by the pump 4 without employing additional parts.

If desired, the following modifications may be adopted in the present invention.

In place of the pump 4, a combination of a main pump and an auxiliary pump, which is used in the brake system of the above-mentioned Japanese Publication, may be used. In this modification, each of the first and second channel brake circuits 1 and 2 is equipped at an upstream portion of the outside and inside gate valves 3 and 9 with a cylinder which receives an additional pressure produced by the auxiliary pump.

In place of the master cylinder MC, a fluid pressure generating structure may be used, which comprises a sensor for sensing a depression degree of the brake pedal, a sensor for sensing a depression speed of the brake pedal, a fluid pressure control valve and a controller. That is, by processing information signals from the sensors, the controller controls the fluid pressure control valve to produce a fluid pressure which corresponds to the brake fluid pressure.

If desired, the first inlet circuit 4f may be connected to the second aligned openings 46b. In this case, the first inlet valve 41 is arranged outside of the cylinder member 46.

What is claimed is:

1. In a motor vehicle having a brake pedal, and at least one road wheel which is equipped with a hydraulically actuated brake cylinder, a hydraulic brake system comprising:

fluid pressure generating means for generating a brake fluid pressure in accordance with an actuation of said brake pedal;

a brake circuit for providing a fluid communication between said fluid pressure generating means and said brake cylinder;

a fluid pressure control valve installed in said brake circuit for controlling the fluid pressure in said brake cylinder;

a reservoir connected to a discharge circuit extending from said fluid pressure control valve;

a pump including a cylinder member, a plunger movably disposed in said cylinder member to define a volume variable pressure chamber, and a seal member operatively disposed between said cylinder member and said plunger to hermetically insulating said pressure chamber;

a first inlet circuit for conveying the brake fluid in said reservoir to said pressure chamber of said pump;

a second inlet circuit for conveying the brake fluid in said fluid pressure generating means to said pressure chamber of said pump;

an outlet circuit for conveying the brake fluid in said pressure chamber of said pump to said fluid pressure control valve;

an outside gate valve for selectively opening and closing said brake circuit;

an inside gate valve for selectively opening and closing said second inlet circuit; and a control unit for controlling said fluid pressure control valve, said pump and said outside and inside gate valves for carrying out an antilock brake control and a vehicle motion stabilizing control, wherein said cylinder rememeber of the pump is formed with a pressure chamber exposed opening through which said second inlet circuit is fluidly communicated with the pressure chamber of the pump, said pressure chamber exposed opening being exposed to said pressure chamber even when said plunger takes a deepest position in the cylinder member to minimize the size of said pressure chamber.

2. A hydraulic brake system as claimed in claim 1, further comprising:

a first inlet valve installed in said first inlet circuit to permit only a fluid flow in the direction from the reservoir to the pressure chamber of said pump;

a second inlet valve installed in said second inlet circuit to permit only a fluid flow in the direction from said fluid flow generating means to the pressure chamber of said pump; and an outlet valve installed in said outlet circuit to permit only a fluid flow in the direction from the pressure chamber of said pump to said fluid pressure control valve, wherein said second inlet valve is positioned outside of said cylinder member.

3. A hydraulic brake system as claimed in claim 2, further comprising:

a plunger outer surface exposed opening formed in said cylinder member, to which said first inlet circuit is connected; and a passage means formed in said plunger to provide a fluid communication between said plunger outer surface exposed opening and the pressure chamber of said pump, wherein said plunger outer surface exposed opening is positioned to face the outer surface of said plunger throughout the stroke of said plunger in the cylinder member.

4. A hydraulic brake system as claimed in claim 3, in which said plunger outer surface exposed opening is positioned between said pressure chamber exposed opening and said seal member of said pump.

5. A hydraulic brake system as claimed in claim 3, in which said passage means comprises:

an annular recess formed in and around the outer surface of said plunger and exposed to said plunger outer surface exposed opening; and an axially extending bore formed in said plunger to fluidly connect said annular recess with said pressure chamber.

6. A hydraulic brake system as claimed in claim 5, in which said first inlet valve comprises:

a ball movably received in said pressure chamber to open and close an open end of said axially extending bore of said plunger; and a biasing spring for biasing said ball against the open end of said axially extending bore.

7. A hydraulic brake system as claimed in claim 1, in which said plunger is reciprocatively moved by a cam driven by an electric motor.

8. A hydraulic brake system as claimed in claim 1, in which the seal member of said pump is received in an annular recess formed in the outer surface of said plunger, said seal member contacting an inner cylindrical surface of said cylinder member to achieve a hermetical sealing therebetween.

9. A hydraulic brake system as claimed in claim 1, in which said pump has in said pressure chamber a return spring for biasing said plunger in a direction to expand the pressure chamber.

10. A hydraulic brake system as claimed in claim 1, in which said fluid pressure control valve functions to reduce, keep and increase the fluid pressure in said brake cylinder.

11. A hydraulic brake system as claimed in claim 1, in which said antilock brake control is a control for suppressing a lock of the road wheel upon braking by controlling the fluid pressure in said brake cylinder.

12. A hydraulic brake system as claimed in claim 1, in which said vehicle motion stabilizing control is a traction control for suppressing a slip of a drive road wheel by applying a controlled braking force to the drive road wheel or a yaw rate control for stabilizing the attitude of the vehicle by controlling the yaw rate of the vehicle by applying a controlled braking force to a selected road wheel in accordance with the running condition of the vehicle.

13. A hydraulic brake system as claimed in claim 1, in which said fluid pressure generating means is a master cylinder actuated by said brake pedal.

* * * * *

UNITED STATES PATENT AND TRADEMARK OFFICE
CERTIFICATE OF CORRECTION

PATENT NO. : 6,070,951
DATED : June 6, 2000
INVENTOR(S) : Chiharu NAKAZAWA

It is certified that error appears in the above-identified patent and that said Letters Patent is hereby corrected as shown below:

On the Cover Page,

Item [73] Assignee, delete "Inisia Jecs Corporation" and insert

--Unisia Jecs Corporation--.

Signed and Sealed this

Seventeenth Day of April, 2001

*Attest:*

NICHOLAS P. GODICI

*Attesting Officer*   *Acting Director of the United States Patent and Trademark Office*